Oct. 31, 1933.  O. F. OLSON  1,933,446
MEASURING APPARATUS
Filed Feb. 27, 1932  2 Sheets-Sheet 1
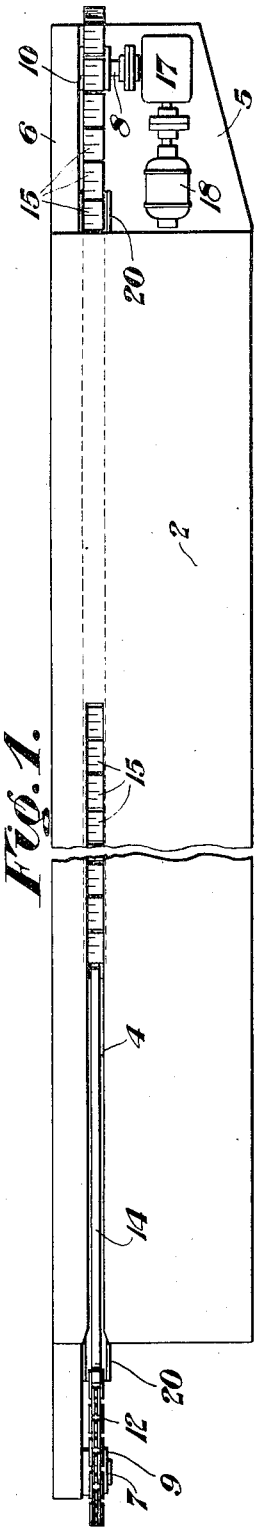
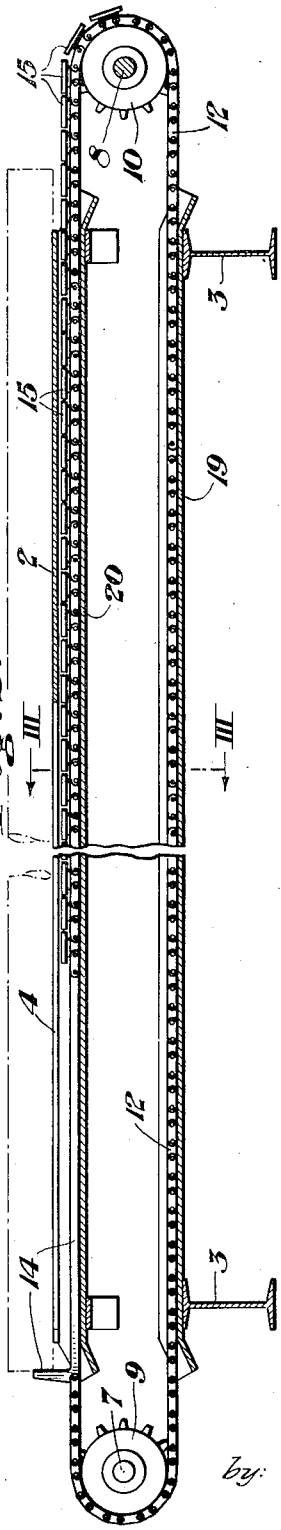
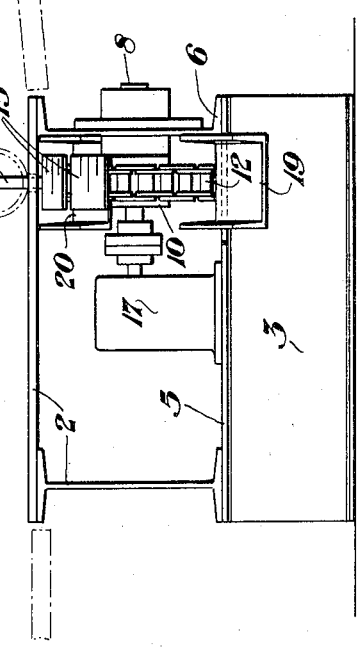
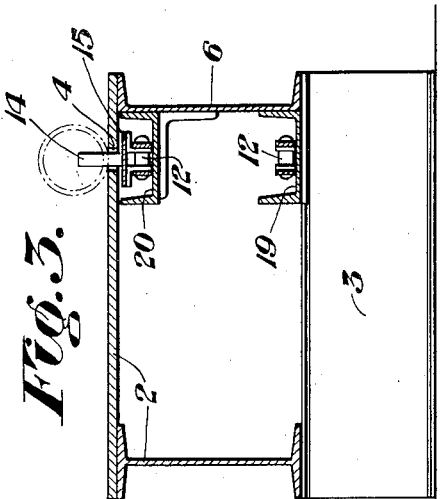
Inventor:
OLOF F. OLSON,
by Usina & Rauber
his Attorneys Oct. 31, 1933.　　　O. F OLSON　　　1,933,446
MEASURING APPARATUS
Filed Feb. 27, 1932　　　2 Sheets-Sheet 2
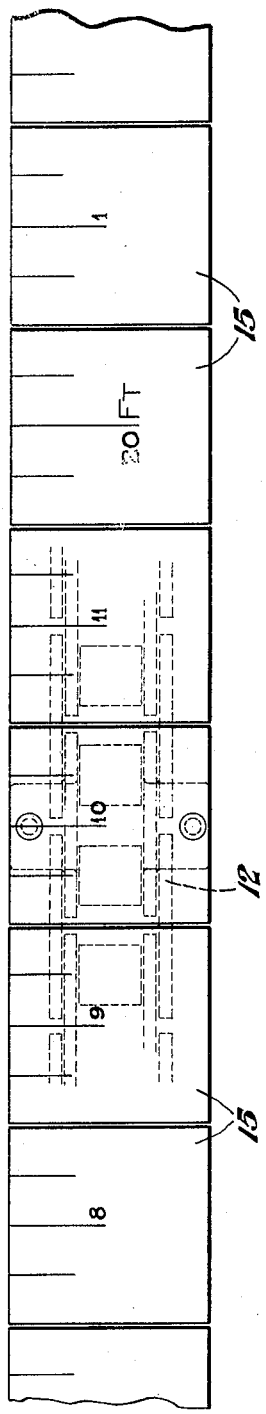
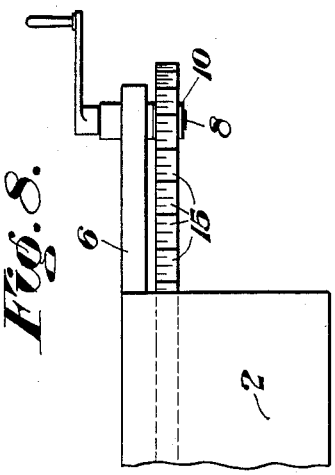
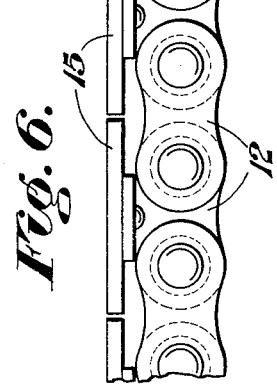
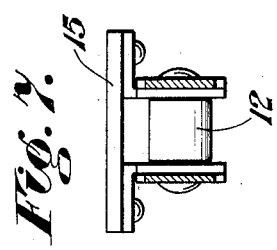
Inventor:
OLOF F. OLSON,
by Usina & Rauber
his Attorneys.

Patented Oct. 31, 1933

1,933,446

UNITED STATES PATENT OFFICE 1,933,446

MEASURING APPARATUS

Olof F. Olson, Gary, Ind., assignor to National Tube Company, a corporation of New Jersey Application February 27, 1932. Serial No. 595,593

6 Claims. (Cl. 33—125)

This invention relates to measuring apparatus and, while not limited thereto, relates more particularly to measuring apparatus for measuring the length of long objects, such as pipe sections, bars, rods and rolled metal shapes.

One object of the present invention is to provide a measuring apparatus of this class which is operable by one man and form a single station.

Another object is to provide apparatus of this class which is adaptable for installation on a weighing scale platform or other worktable so as to permit an object to be measured at the same time it is being weighed or worked upon.

In the drawings:

Figure 1 is a plan of a scale platform having the measuring apparatus of this invention applied thereto.

Figure 2 is a sectional elevation through the platform of Figure 1.

Figure 3 is a transverse sectional elevation on the line III—III of Figure 2.

Figure 4 is an end elevation taken at the operating end of the platform of Figure 1.

Figure 5 is a fragmentary enlarged plan of the measuring chain showing the indicia-carrying plates.

Figures 6 and 7 are large fragmentary details of the measuring chain.

Figure 8 is a fragmentary detail showing a modification in which a hand crank is used to operate the head sprocket.

Referring more particularly to the drawings, the numeral 2 designates a scale platform which is supported on the usual scale beams 3. The deck or top face of the platform 2 is provided with a slot 4 which extends for an appreciable distance lengthwise of the platform. One end of the platform 2 is extended as at 5 to form a suitable supporting structure for the operating mechanism of the measuring apparatus. The rear platform beam 6 is extended at both ends of the platform and has shafts 7 and 8 mounted adjacent its opposite ends. Sprockets 9 and 10 are mounted on the shafts 7 and 8, respectively, and a sprocket chain 12 is trained over the sprockets 9 and 10, and an L-shaped stop member 14 has its horizontal leg connected to the opposite ends of the chain 12 forming a continuous carrying member. The vertical leg of the stop member 14 is of sufficient height to extend upwardly through the slot 4 and engage the end of the object being measured. However, said vertical leg is of materially less length than the horizontal leg of the stop member so as to prevent tilting of said stop member when said member engages the object to be measured.

A series of indicia-carrying plates 15 are secured to alternate links of the chain 12 for an appreciable length of said chain and said plates are of greater width than the slot 4 so as to bridge said slot and prevent lifting of the chain when the vertical leg of the stop member 14 engages the object to be measured. The indicia-carrying plates 15 are arranged with relation to the vertical leg of the stop member 14 so as to indicate a definite length at the right hand end of the table or platform 2.

The shaft 8 carrying the sprocket 10 is coupled to a speed reducing mechanism 17 which, in turn, is coupled to a motor 18 so as to provide a power drive for reciprocating the chain 12 and stop member 14.

It will be understood that instead of the power operated mechanism a simple hand crank mechanism, such as shown in Figure 8 may be substituted, if desired.

In order to prevent sagging of the carrier member or chain 12, suitable guides 19 and 20 are provided extending under the upper and lower stretches of the chain between the sprockets 9 and 10.

In operation with apparatus constructed as shown in combination with a weighing scale platform the pipe or other object to be measured is moved onto the deck of the platform 2 and the motor 18 is energized to move the chain 12 and stop 14 to the right until the vertical leg of the stop 14 engages the left hand end of the object to be measured, at which time the motor 18 will be deenergized. By referring to the indicator on the one of a series of plates carried by the chain next the right hand end of the object being measured, the operator may readily read the length of the object.

When the apparatus is employed in a scale platform the operator may simultaneously weigh and measure the object, thereby performing the two operations without shifting or handling the object. After the length of the object has been determined by the operator he will reverse the motor 18 so as to shift the stop member 14 and chain 12 to the left, thereby providing sufficient clearance for the movement of the next object to be measured.

While I have shown and described one specific embodiment of my invention, it will be understood that I do not wish to be limited thereto since various modifications may be made without departing from the scope of my invention, as defined in the appended claims.

I claim:

1. A device of the class described comprising a flexible carrier member including a portion extending adjacent an object to be measured, a stop member carried by said carrier member, a series of indicia-carrying plates mounted on said carrier member, and means for propelling said carrier member to move said stop member into engagement with the object to be measured.

2. A device of the class described comprising a pair of horizontally spaced sprockets, an L-shaped stop member, a sprocket chain carrier member trained over said horizontally spaced sprockets and having its ends connected to the opposite ends of the horizontal leg of said L-shaped stop member, the vertical leg of said member being of materially less length than said horizontal length, a series of indicia-carrying plates secured to said chain and means for operating at least one of said sprockets to move said chain about said sprockets and thereby move the vertical leg of said stop member into engagement with the object to be measured.

3. A device of the class described comprising a pair of horizontally spaced sprockets, an L-shaped stop member, a sprocket chain carrier member trained over said horizontally spaced sprockets and having its ends connected to the opposite ends of the horizontal leg of said L-shaped stop member, the vertical leg of said member being of materially less length than said horizontal length, a series of indicia-carrying plates secured to alternate lengths of said chain in advance of said stop member, and power means for operating at least one of said sprockets to move said chain about said sprockets and thereby move the vertical leg of said stop member into engagement with the object to be measured.

4. The combination with a platform having an elongated slot therein and adapted to receive elongated objects to be measured for length, of a measuring apparatus comprising a pair of sprockets mounted adjacent the opposite ends of and below the supporting surface of said platform, an L-shaped stop member, a sprocket chain trained around said sprockets and having its opposite ends connected to the opposite ends of the horizontal leg of said L-shaped stop member, the vertical leg of said stop member being of materially less length than said horizontal leg and projecting upwardly through the slot in said platform, a series of indicia-carrying plates secured to said chain in advance of said stop member, and means for operating at least one of said sprockets to move said chain about said sprockets and thereby move the vertical leg of said stop member longitudinally of said slot and into engagement with the object to be measured.

5. The combination with a scale platform having an elongated slot in the supporting face thereof and adapted to receive elongated objects to be measured for length, of a measuring apparatus comprising a pair of sprockets mounted adjacent the opposite ends of and below the supporting surface of said platform, an L-shaped stop member, a sprocket chain trained around said sprockets and having its opposite ends connected to the opposite ends of the horizontal leg of said L-shaped stop member, the vertical leg of said stop member being of materially less length than said horizontal leg and projecting upwardly through the slot in said platform, a series of indicia-carrying plates secured to alternate lengths of said chain in advance of said stop member, and power means for operating at least one of said sprockets to move said chain about said sprockets and thereby move the vertical leg of said stop member longitudinally of said slot into engagement with the object to be measured.

6. The combination with a platform having an elongated slot therein and adapted to receive elongated objects to be measured for length, of a measuring apparatus comprising a pair of sprockets mounted adjacent the opposite ends of and below the supporting surface of said platform, an L-shaped stop member, a sprocket chain trained around said sprockets and having its opposite ends connected to the opposite ends of the horizontal leg of said L-shaped stop member, the vertical leg of said stop member being of materially less length than said horizontal leg and projecting upwardly through the slot in said platform, a series of indicia-carrying plates secured to said chain in advance of said stop member, vertically spaced stationary horizontal guide members arranged between said sprockets for supporting and preventing sagging of said sprocket chain, and power means for operating at least one of said sprockets to move said chain about said sprockets and thereby move the vertical leg of said stop member longitudinally of said slot into engagement with the object to be measured.

OLOF F. OLSON.